United States Patent [19]

Sinkovitz et al.

[11] 4,100,079
[45] Jul. 11, 1978

[54] POLYMERS FOR ACID THICKENING

[75] Inventors: Gloria DiMarco Sinkovitz, Bridgeville, Pa.; Andrew Jackson Sharpe, Jr., Cheshire, Conn.

[73] Assignee: Calgon Corporation, Pittsburgh, Pa.

[21] Appl. No.: 772,051

[22] Filed: Feb. 25, 1977

[51] Int. Cl.² ............................................. E21B 43/27
[52] U.S. Cl. ............................... 252/8.55 C; 166/282; 166/283; 252/8.55 R; 526/295
[58] Field of Search ............ 252/8.55 C, 8.55 R, 252/8.55 D; 166/283, 282; 526/304, 310, 295

[56] References Cited

U.S. PATENT DOCUMENTS

| Re. 28,543 | 9/1975 | Boothe et al. | 428/514 |
| 2,923,701 | 2/1960 | Schuller et al. | 526/304 X |
| 3,442,803 | 5/1969 | Hoover et al. | 252/8.55 |
| 3,562,226 | 2/1971 | Gayley et al. | 166/308 X |
| 3,747,676 | 7/1973 | Norton et al. | 252/8.55 X |
| 3,909,423 | 9/1975 | Hessert et al. | 252/8.55 |
| 3,943,060 | 3/1976 | Martin et al. | 252/8.55 |

*Primary Examiner*—Herbert B. Guynn
*Attorney, Agent, or Firm*—Rudolph J. Anderson, Jr.; Mario A. Monaco; Martin L. Katz

[57] ABSTRACT

Acids, particularly dilute acid solutions thickened with copolymers of dimethyl diallyl ammonium chloride and a monomer capable of postreaction after polymerization to provide branching or partial crosslinking, are useful as oil well drilling and fracturing fluids for stimulating well production.

7 Claims, No Drawings

POLYMERS FOR ACID THICKENING

BACKGROUND OF THE INVENTION

The present invention relates to compositions and a method for the hydraulic fracturing of subterranean formations penetrated by a well. Particularly, the present invention relates to the use as hydraulic fracturing fluids of acids, especially dilute acid solutions thickened with copolymers of dimethyl diallyl ammonium chloride and a monomer capable of postreaction after polymerization to provide branching or partial crosslinking which extends the chain length of dimethyl diallyl ammonium chloride polymers. Suitable monomers capable of postreaction after polymerization to provide branching or partial crosslinking include N-methylolacrylamide and diacetone acrylamide.

In the art of producing oil or gas from a subterranean formation, it is well known that production can be greatly increased by hydraulically fracturing the formation. In a hydraulic fracturing operation, a fracturing fluid is forced down a well bore under high pressures to fracture the rock formation surrounding the well bore. The pressure is then released allowing the oil or gas to seep through the fractures into the well bore where it is then pumped to the surface.

Most commonly, fresh water or aqueous brine are used as the fracturing medium in oil field operations. The brines usually contain from a few parts per million to high percentages of dissolved salts. In fact, oil field brines sometimes contain total dissolved solids of up to about 10 percent or higher. Particularly, common brines which are difficult to use with polymeric additives are those having dissolved alkaline earth metal salt concentrations of more than 1,000 rpm. Most oil field brines contain at least several hundred ppm of calcium in addition to 2 percent or more sodium chloride and potassium chloride.

In addition, it is also well known in the art of producing oil or gas from a subterranean formation that fluid production can occasionally be stimulated by injecting acid solutions into the formation by way of the well bore. This is especially true when the reservoir contains large amounts of carbonate rock such as limestone, dolomite, and the like. The acid reacts with the carbonate content of the rock, thereby creating channels in the rock between the reservoir and the well bore. This increases the effective drainage area of the well bore, stimulating production.

The most commonly used acid for this purpose is hydrochloric. However, other acids such as hydrofluoric, nitric, formic, acetic and sulfonic have also been highly successful in increasing production in calcareous formations. Mixtures of two or more different acids have also been used, especially mixtures containing hydrofluoric acid. The acids are usually employed as 1 percent to 35 percent by weight solutions in water. However, because of the scarcity of fresh water and economics, it is often necessary to employ oil field brine as the aqueous medium in place of water. In these cases, the aqueous medium will be an acidic brine.

Acidizing and hydraulic fracturing are generally combined into one treatment by employing an acidic fluid under hydraulic fracturing pressures. This combination treatment of the well is called acid fracturing and it stimulates production by obtaining the benefits of both the chemically created channels and the pressure created fractures. When acid fracturing, the aqueous fluid may be an acid solution or an acidic brine as described above.

It is desired that the fracturing fluid be viscous in nature since this will permit the fracturing fluid to remain in the fracture long enough to permit build-up and maintenance of sufficient pressure to open a fracture. Moreover, a viscous fracturing fluid is capable of supporting propping agents, which are particulated solids suspended in the fracturing fluid for the purpose of maintaining the fracture in an open condition, by being deposited in the fracture once created. Generally, it is desired that the fracturing fluid have a viscosity of at least about 25 centipoises, as measured by Fann Model 35 Viscometer at 25° C. and at 100 rpm, for a 1 percent by weight concentration of thickening agent.

SUMMARY OF THE INVENTION

Copolymers of dimethyl diallyl ammonium chloride and a monomer capable of postreaction after polymerization to provide branching or partial crosslinking such as N-methylolacrylamide and diacetone acrylamide are useful as acid thickeners in oil well drilling and fracturing operations because of their acid stability, heat stability and salt stability.

These polymers may be prepared by conventional solution polymerization methods and may contain from about 50 to about 98 weight percent dimethyl diallyl ammonium chloride and from about 2 to about 50 weight percent of a monomer capable of postreaction after polymerization to provide branching or partial crosslinking, as for example N-methylolacrylamide or diacetone acrylamide, preferably about 90 to about 97 weight percent dimethyl diallyl ammonium chloride and about 3 to about 10 weight percent of a monomer capable of postreaction after polymerization to provide branching or partial crosslinking.

The thickening agents of the present invention are useful over a wide range of molecular weights, from as little as about 5,000 to as much as several hundred thousand to one million or more. The molecular weight utilized will be determined by a number of factors, but generally the higher molecular weight materials will produce proportionately more thickening of the acid-based liquid, which is ordinarily desired.

The thickening agents of the present invention may be employed satisfactorily in concentration amounts as low as 0.5 percent by weight of the acid-based liquid being thickened. Higher concentrations of 10 percent by weight or more may be employed, but the range of concentration amounts will ordinarily be from about 1 to about 5 percent by weight. As with molecular weight of the polymeric thickening agents of the present invention, the concentration of the thickening agent which is desired will depend on a number of factors, but especially upon the vicosity of the final thickened acid composition which is desired.

In accordance with the present invention, the copolymers of dimethyl diallyl ammonium chloride and a monomer capable of postreaction after polymerization to provide branching or partial crosslinking operate at thickening agents for acid solutions in that when added to the acid solutions in an effective concentration amount, they produce an increase in the viscosity of the solutions. The increase in viscosity may be extensive enough to produce a gel, although this is not essential.

The acid solution fracturing fluids with which the thickening agents comprising copolymers of dimethyl diallyl ammonium chloride and a monomer capable of postreaction after polymerization to provide branching or partial crosslinking are employed can also contain fluid loss control additives, surfactants, propping agents and clay control chemicals which are compatible with the thickening agents of the present invention.

The following examples illustrate the ability of the dimethyl diallyl ammonium chloride/N-methylolacrylamide thickening agents of the present invention to increase the viscosity of acids.

EXAMPLE 1

The thickening agent evaluated was a 90/10 weight percent copolymer of dimethyl diallyl ammonium chloride/N-methylolacrylamide having a Brookfield viscosity of 4700 cps at 50 percent solids. The polymer was diluted to a 10 percent aqueous solution and further diluted to 1 percent polymer in water and 1 percent polymer in 10 percent hydrochloric acid. The resultant test samples were subjected to viscosity determinations using a Fann Model LVT Viscometer, Spindle No. 1, at the rpm's indicated in the table of values below, and at 25° C. The results of the determinations are illustrated in the following table of values:

Table 1

| Fann Viscosity in Water | |
|---|---|
| RPM | CPS |
| 100 | 27.0 |
| 200 | 22.5 |
| 300 | 20.0 |
| 600 | 11.5 |

The solution was placed in 60° C. over for 24 hours and remained water-white and clear, thereby demonstrating heat stability in aqueous solution.

Table 2

| | Fann Viscosity in 10% Hydrochloric Acid | |
|---|---|---|
| RPM | CPS Before Heating to 60° C | CPS After 24 Hrs at 60° C |
| 100 | 21.0 | 21.0 |
| 200 | 15.0 | 15.0 |
| 300 | 12.0 | 12.0 |
| 600 | 10.0 | 10.0 |

The solution remained water-white and clear after 24 hours at 60° C. thereby demonstrating heat stability in acid solution.

EXAMPLE 2

A 97/3 weight percent dimethyl diallyl ammonium chloride/N-methylolacrylamide copolymer was evaluated at a 1 percent concentration in a 10 percent hydrochloric acid solution. The other conditions and apparatus were the same as for the determinations described in Example 1. The results of the determinations are illustrated in the following table of values:

Table 3

| | Fann Viscosity in 10% Hydrochloric Acid | |
|---|---|---|
| RPM | CPS Before Heating to 60° C | CPS After 24 Hrs. at 60° C |
| 100 | 36.0 | 30.0 |
| 200 | 25.5 | 19.5 |
| 300 | 23.0 | 18.0 |
| 600 | 17.5 | 16.0 |

The solution remained water-white and clear after 24 hours at 60° C. thereby demonstrating heat stability in acid solution.

An aliquot of 1 percent polymer in acid solution was placed in a jar containing calcite crystals. After three days, solution remained water-white and clear, thereby demonstrating calcium stability.

We claim:

1. A method of fracturing a subterranean formation comprising:
   a. contacting said formation with an aqueous fracturing fluid which contains an acid which is capable of reacting with subterranean carbonate formations and as a thickening agent therefore at least 0.5 percent by weight of the acid and water of a copolymer having a molecular weight of at least 5,000, said copolymer containing from about 50 to about 98 weight percent dimethyl diallyl ammonium chloride and from about 2 to about 50 weight percent of a monomer capable of postreaction after polymerization to provide branching or partial crosslinking said monomer being selected from the group consisting of N-methylolacrylamide and diacetone acrylamide;
   b. applying sufficient pressure to the said fracturing fluid to fracture said formation; and
   c. maintaining said pressure while forcing said fracturing fluid into said fracture.

2. The method of claim 1 wherein the monomer capable of postreaction after polymerization to provide branching or partial crosslinking is N-methylolacrylamide.

3. A fracturing fluid composition for use in fracturing subterranean formations comprising:
   (a) water;
   (b) acid which is capable of reacting with subterranean carbonate formations; and
   (c) at least 0.5 percent by weight of the acid and water of a thickening agent composition consisting essentially of a copolymer having a molecular weight of at least 5,000, said copolymer containing from about 50 to about 98 weight percent dimethyl diallyl ammonium chloride and from about 2 to about 50 weight percent of a monomer capable of postreaction after polymerization to provide branching or partial crosslinking said monomer being selected from the group consisting of N-methylolacrylamide and diacetone acrylamide.

4. The composition of claim 3 wherein the acid is hydrochloric acid.

5. The composition of claim 3 wherein the monomer capable of postreaction after polymerization to provide branching or partial crosslinking is N-methylolacrylamide.

6. A method of thickening a mixture of water and one acid which is capable of reacting with subterranean carbonate formations which comprises adding thereto at least 0.5 percent by weight of the acid and water of a thickening agent composition consisting essentially of a copolymer having a molecular weight of at least 5,000, said copolymer containing from about 50 to about 98 weight percent dimethyl diallyl ammonium chloride and from about 2 to about 50 weight percent of a monomer capable of postreaction after polymerization to provide branching or partial crosslinking said monomer being selected from the group consisting of N-methylolacrylamide and diacetone acrylamide.

7. A method as in claim 6 wherein the monomer capable of postreaction after polymerization to provide branching or partial crosslinking is N-methylolacrylamide.

* * * * *